United States Patent

Raab

US005768792A

[11] Patent Number: 5,768,792
[45] Date of Patent: Jun. 23, 1998

[54] METHOD AND APPARATUS FOR MEASURING AND TUBE FITTING

[75] Inventor: Simon Raab, Longwood, Fla.

[73] Assignee: Faro Technologies Inc., Lake Mary, Fla.

[21] Appl. No.: 600,275

[22] Filed: Feb. 9, 1996

[51] Int. Cl.$^6$ ............................ G01B 5/012; A61B 5/103
[52] U.S. Cl. ............................... 33/503; 33/529; 33/553; 33/555
[58] Field of Search ............................ 33/503, 504, 505, 33/529, 549, 551, 553, 554, 555

[56] References Cited

U.S. PATENT DOCUMENTS

| | | | |
|---|---|---|---|
| 2,556,381 | 6/1951 | White | 33/545 |
| 4,122,607 | 10/1978 | Hopf | 33/555 |
| 4,122,608 | 10/1978 | Hopf | 33/549 |
| 4,258,474 | 3/1981 | DuMez | 33/520 |
| 4,593,476 | 6/1986 | Clark et al. | 33/551 |
| 5,208,995 | 5/1993 | McKendrick | 33/549 |
| 5,400,517 | 3/1995 | McKendrick | 33/549 |
| 5,408,754 | 4/1995 | Raab | 33/503 |

FOREIGN PATENT DOCUMENTS 1548653  3/1990  U.S.S.R. .................. 33/503

*Primary Examiner*—Christopher W. Fulton
*Attorney, Agent, or Firm*—Fishman, Dionne, Cantor & Colburn

[57] ABSTRACT

A method and apparatus for measuring position and orientation of features of a part or item and tube fitting using a portable coordinate measuring machine (CMM) is presented. The coordinate measuring machine comprising a multijointed manually, positionable measuring arm for accurately and easily measuring the position of a point in space by using a special probe, which may be a disk, to perform the tube fitting is interconnected with a host computer. The tube fitting is performed using a coordinate measuring machine in conjunction with appropriate CAD (computer and design) based inspection software which includes tube fitting capabilities.

9 Claims, 5 Drawing Sheets

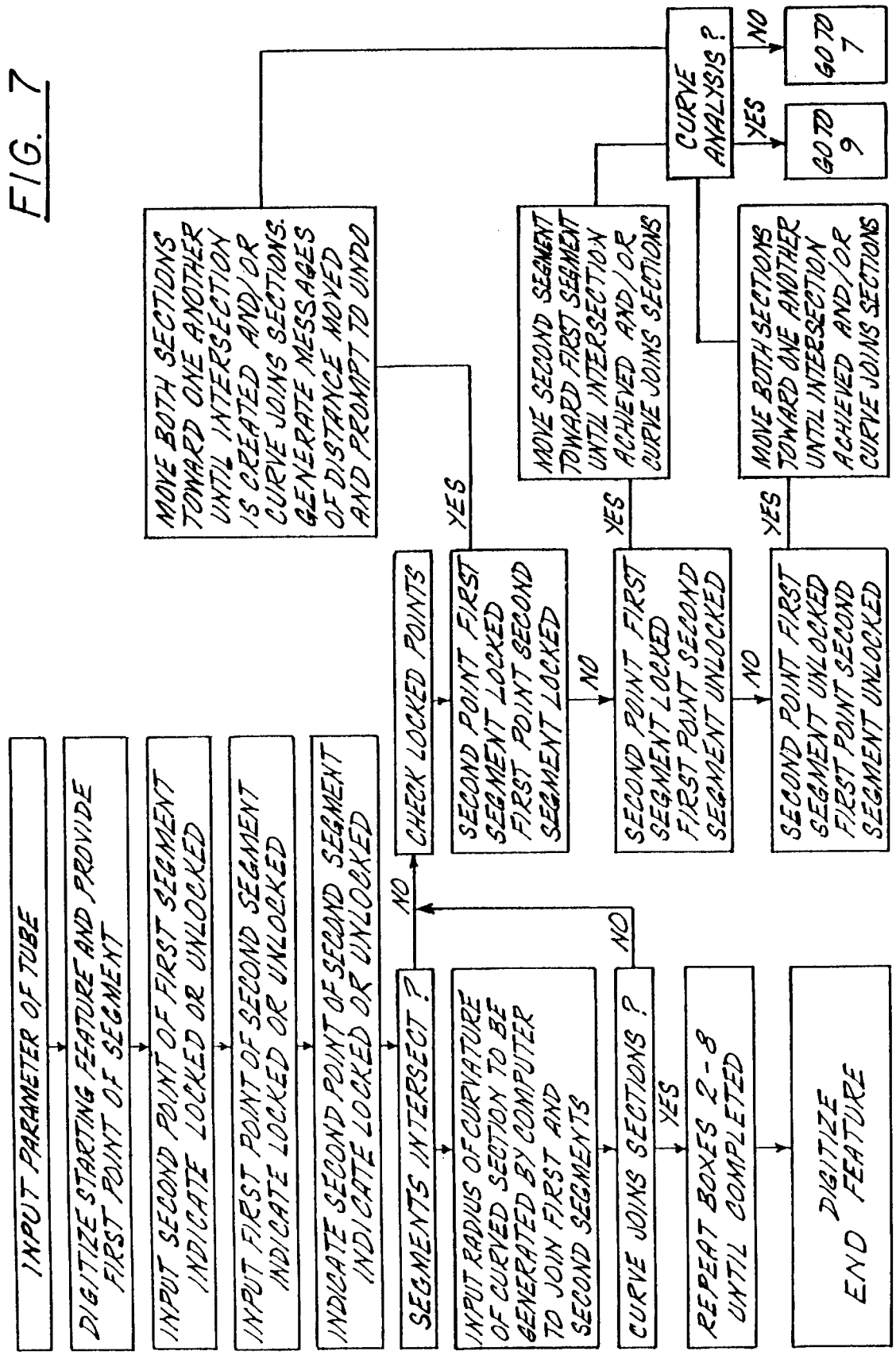

METHOD AND APPARATUS FOR MEASURING AND TUBE FITTING

BACKGROUND OF THE INVENTION

This invention relates generally to a method and apparatus for measuring the position and orientation of features of a part or item. More particularly, the present invention relates to a method and apparatus for measuring and calculating position and orientation of features of a part or item, specifically, an item of tubular nature as in the art of tube fitting, using a portable coordinate measuring machine (CMM).

Tube manufacture is an area of manufacturing which is spread over a wide range of available technologies, from the simplest, most manual methodology for bending and fitting tubes by hand, to the more advanced CAD (computer-aided design) design tubing systems with digital output for NC (numerically controlled) tube benders. The profession of tube or pipe fitting has a long and substantial history, starting with the very early steam powered products which required the fitting of metal tubes around a set of obstructions and between two tube fittings. The importance of tube fitting in the marine, defense and aerospace industries has required a steady flow of experienced tube/pipe fitters, who must pass through a process of apprenticeship.

The ability to think in three dimensions, to visualize the reasonable radius of bends, to understand the issues of shrinkage and welding deformations, all comprise what amounts to an art requiring much experience and know-how.

As CAD begins to replace the "as-built" approach, issues of materials stress and dimensional changes with production are becoming fully implemented. This science has risen to an extreme level in the nuclear tube fitting environment where tube stress and stress corrosion relating to tube configuration of materials has become an important safety factor. While CAD has revolutionized tube design and, in many cases, eliminated the need for the tube fitter's job, there still remains an enormous base of undocumented installations and custom short run requirements.

Notwithstanding, recent advances in the filed of tube fitting, such tube fitting often continues to involve the use of manually bendable tube or wire templates, which have been manually fitted by a tube fitter in the location desired, after which this template is carefully removed and measured for conversion to a dimensioned tube bending format for either manual or automated tube bending. The process of forming the tube bends, etc. can be tedious and fairly inaccurate, resulting in several repeats in the fitting process before successful completion of a tube.

SUMMARY OF THE INVENTION

The above-discussed and other problems and deficiencies of the prior art are overcome or alleviated by the method and apparatus of the present invention for measuring position and orientation of features of a part or item, using a portable coordinate measuring machine. A portable CMM is an articulated and instrumented arm capable of measuring in three dimensions with six or more degrees of freedom. The measurement end of the articulated arm can measure its position in space, that is X, Y and Z coordinates and the orientation of the end effector or probe in terms of angles A, B and C. A preferred coordinate measuring machine is the CMM described in U.S. Pat. No. 5,402,582 issued Apr. 4, 1995 to Raab which is assigned to the assignee hereof, all of the contents of which are incorporated herein by reference. This CMM comprises a multijointed (preferably six joints) manually positionable measuring arm for accurately and easily measuring the position of one or more measurement cylindrical areas between two planes.

The method of the present invention is particularly well suited for tube fitting. Such tube fitting is performed using a portable CMM (coordinate measuring machine such as that provided in U.S. Pat. No. 5,402,582) or the like in conjunction with appropriate CAD (computer aided design) software which includes tube fitting capabilities. The preferred portable CMM weighs from fifteen to thirty pounds and is usually connected to a conventional portable laptop computer. The software utilized in this invention has the ability to deal with the diverse set of inspection problems that is essential to adapt the system and apparatus for the system's use in tube fitting and inspection.

In a typical example, a portable CMM is clamped in a region central to the tube required. At the end of the arm of the CMM, a special probe, which may include a disk shaped interference extension, is mounted. Where a disk shaped interference extension is desired, there are various disks available to simulate the many different possible cross-sections of tube sizes as required for the application. The required disk or other interference extension is mounted to a swivel attachment at the end of the probe connected to the arm of the CMM. The probe is used to provide means for determining the X, Y and Z position of the center of the prospective tube while the interference extension provides a simple mechanical means to determine minimum distances required from any obstructions, automatically compensating for tube diameter. Since the tube fitter is simply using a pointer in mid-air or space, each end point is specified as either locked or adjustable. The software is thus permitted to adjust the length of any straight sections of tubing to be joined by simple constant radius bends. The computer screen presents tube sections and bend sections in real time as the tube profile is being created.

Since the CMM is CAD-based, once the final straight section has been measured the tube fitting software will automatically calculate the specifications for purposes of analysis and manufacture. The software resulting from this invention can generate data in a variety of formats for different bending machines including relative, absolute, clockwise or counter clockwise formats.

The present invention avoids the prior art necessity of time consuming and costly trial and error tube fitting and replaces "as built" methods with accuracies of up to +/−0.003" and is especially time saving and cost reducing in undocumented installations and custom short runs.

The above-discussed and other features and advantages of the present invention will be appreciated and understood by those skilled in the art from the following detailed description and drawings.

BRIEF DESCRIPTION OF THE DRAWINGS

Referring to the drawings, wherein like elements are numbered alike in the several FIGURES:

FIG. 7 is a flow chart disclosing the software process of the invention.

DESCRIPTION OF THE PREFERRED EMBODIMENT

Figure 1:
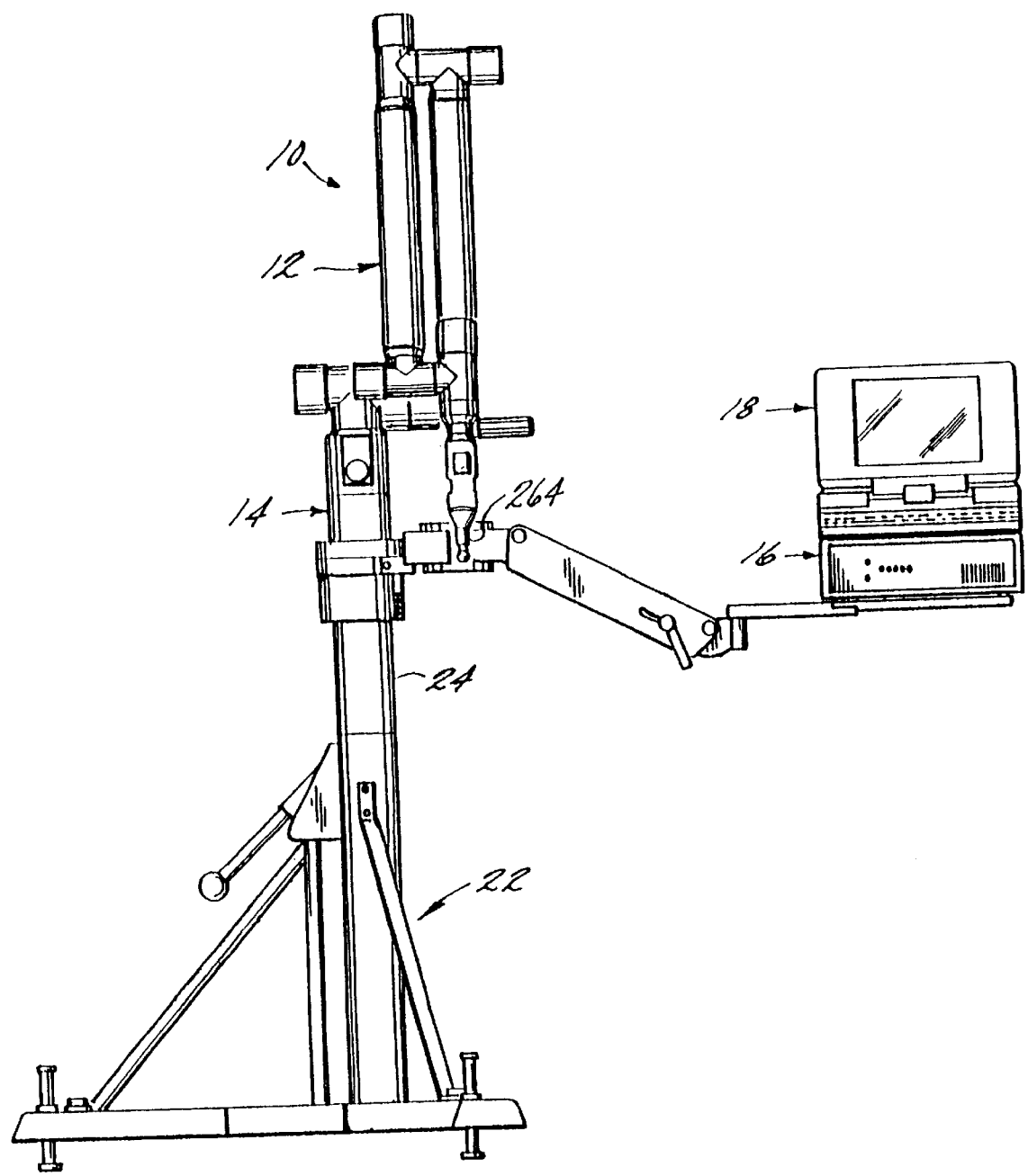
FIG. 1 is a side diagrammatic view depicting the three dimensional measuring system including a coordinate measuring machine (CMM), a controller box and a host computer.

Referring first to FIG. 1, a three dimensional measuring system for use in the present invention generally comprises a coordinate measuring machine (CMM) 10 composed of a manually operated multijointed arm 12 and a support base or post 14, a controller or serial box 16 and a host computer 18. It will be appreciated that CMM 10 electronically communicates with serial box 16 which, in turn, electronically communicates with host computer 18.

CMM 10 includes transducers (e.g., one transducer for each degree of freedom) which gather rotational positioning data and forward this basic data to serial box 16. Serial box 16 provides a reduction in the overall requirements of host computer 18 to handle certain complex calculations and provides certain preliminary data manipulations. Basic transducer data is sent from CMM 10 to serial box 16. Serial box 16 then processes the raw transducer data on an ongoing basis and responds to the queries of the host computer with the desired three-dimensional positional or orientational information.

Preferably, all three components defining the three dimensional measuring system of this invention (e.g., CMM 10, serial box 16 and host computer 18) are mounted on either a fixed mounting surface using a rigid plate and/or a standard optical measurement instrument thread followed by mounting on a known and standard theodolite mobile stand, such as part no. MWS750 manufactured by Brunson. Such a mobile stand is characterized by a stable rolling platform with an extendable vertical tower and with common attachments and locking mechanisms.

A commercially available CMM for use in the present invention is the METRECOM MODEL: IND-01 Coordinate Measuring Machine commercially available from FARO Technologies, Inc., Industrial Division, 125 Technology Park, Lake Mary, Fla. 32746 (assignee of the present invention) may be employed.

A CMM (e.g., as described above with reference to U.S. Pat. No. 5,402,582, the METRECOM Model: IND-01, or other commercially available CMM) is used to measure the position of a probe which includes a device having any one of a plurality of geometric shapes which are designed to match features of a work piece such as the diameter (e.g., of a formed piece of tubing, such as an automobile exhaust pipe), these devices are referred to herein as "interference extensions" which may take whatever shape the application demands and are discussed more fully below.

Figure 2A:
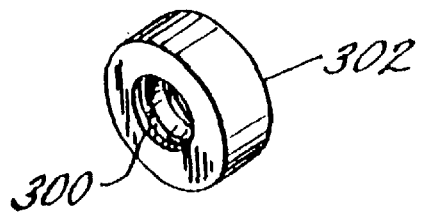
FIG. 2A is an interference probe on a swivel ball fitting in accordance with the present invention.
Figure 2B:
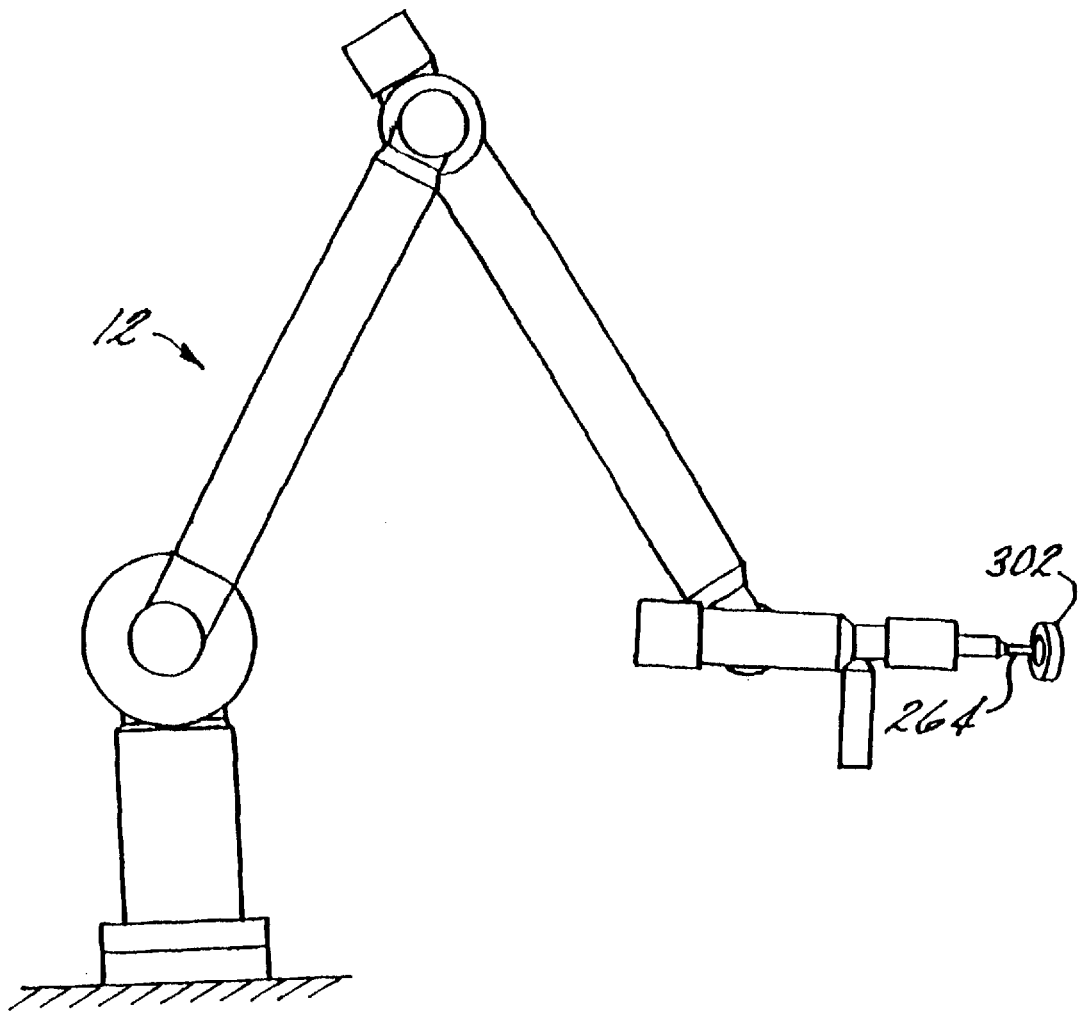
FIG. 2B is a schematic view of a CMM fitted with an interference probe in accordance with the present invention for pipe fitting.

Referring next to FIGS. 2A and 2B, a standard CMM industrial arm is schematically depicted at 12. A standard known ball probe 264 has a ball which fits into a snap on fitting 300 (the geometric shape of the interference extension having a hole therethrough with concave side walls sufficient to "snap" onto the ball) which is integral with an interference extension or in the illustration, disk 302, of any appropriate size (sizes may range to any dimension imaginable but generally range in the 0.25" diameter to the 6" diameter range for the most commonly employed tubing or pipe formations). CMM arm 12 is clamped in the region central to the required tube. FIG. 2A depicts a typical interference extension with its snap-on fitting. The snap-on fitting 300 is preferably configured as an integral element of interference disk 302. In accordance with the present invention, the method of tube fitting may be best explained by the following example as discussed hereinafter.

A length of tubing is required to travel from one fitting to another fitting in an automobile engine compartment and is required to go around a number of existing obstructions and the diameter of the tubing required is a 1" O.D. (Outer diameter) tubing. Interference disk 302 represents the 1" diameter of the required tube. Snap-on fitting 300 allows the interference disk 302 to be oriented in any direction required. The interference extension simulates the cross section of any desired tube size be it round or otherwise. In this particular example, the required tube is a 1" tube, hence the 1" interference extension with its integral swivel attachment joint is mounted to the end of the probe on the CMM arm. The integral swivel attachment is used to provide a simple mechanical means of determining the X, Y and Z position of the center of the tube with respect to any obstructions, automatically compensating for the tube diameter.

Figure 4:
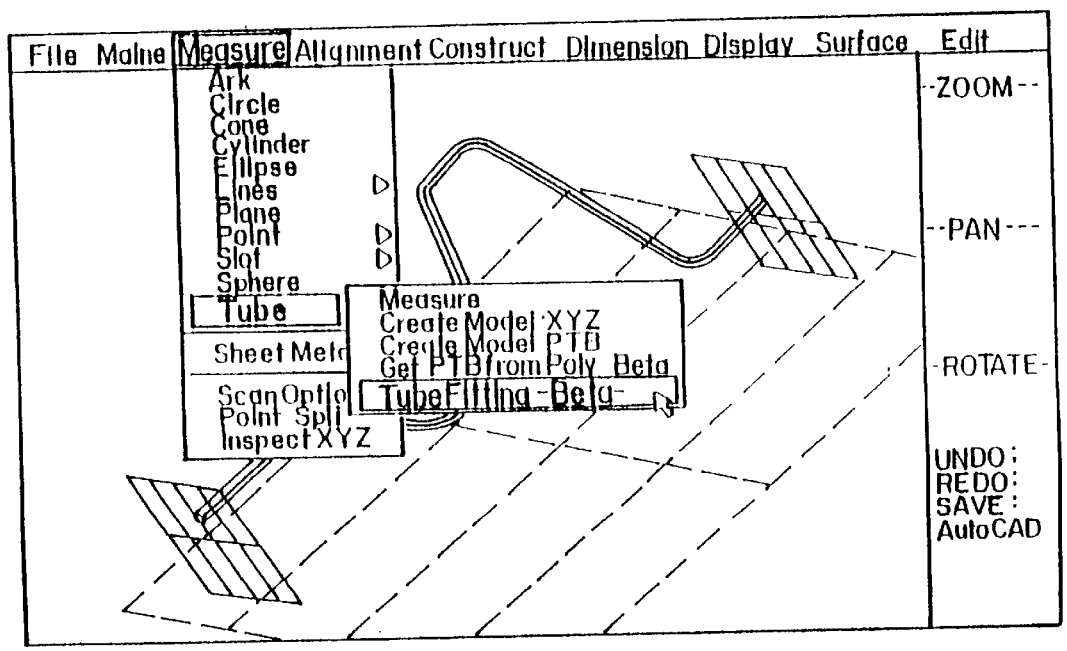
FIG. 4 depicts a computer screen utilizing a complete CAD-based CMM and software in accordance with the present invention showing the drop down selection menus superimposed over the tube profile model.
Figure 5:
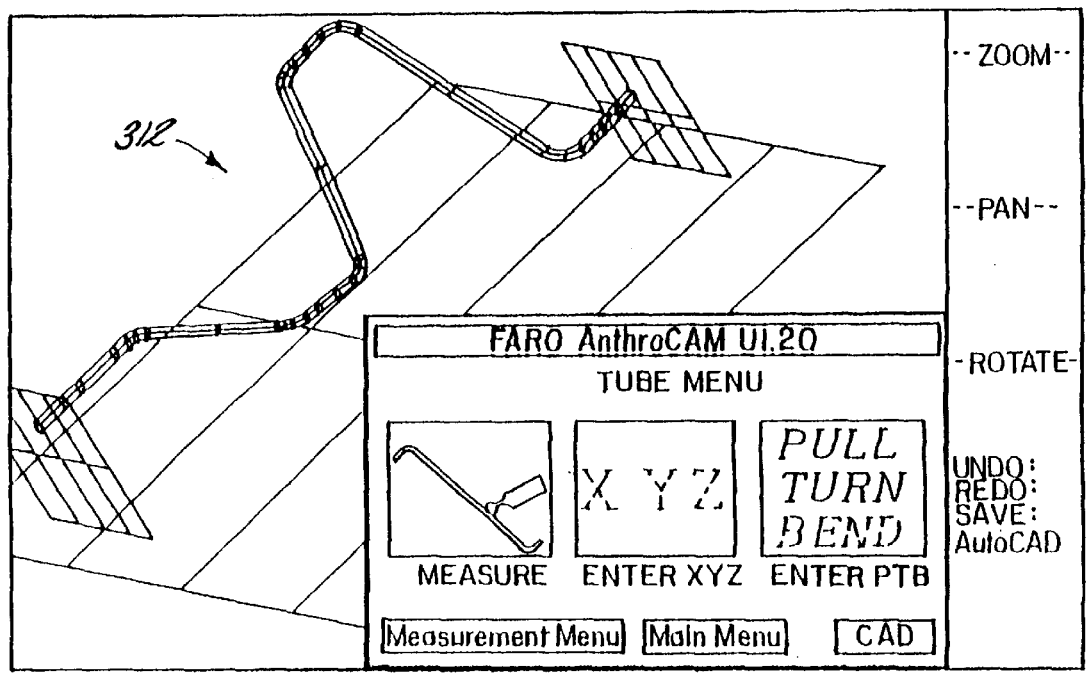
FIG. 5 depicts the computer screen of FIG. 4 showing alternative Icon selection buttons for easy selection by the arm control feature in accordance with the present invention.
Figure 6:
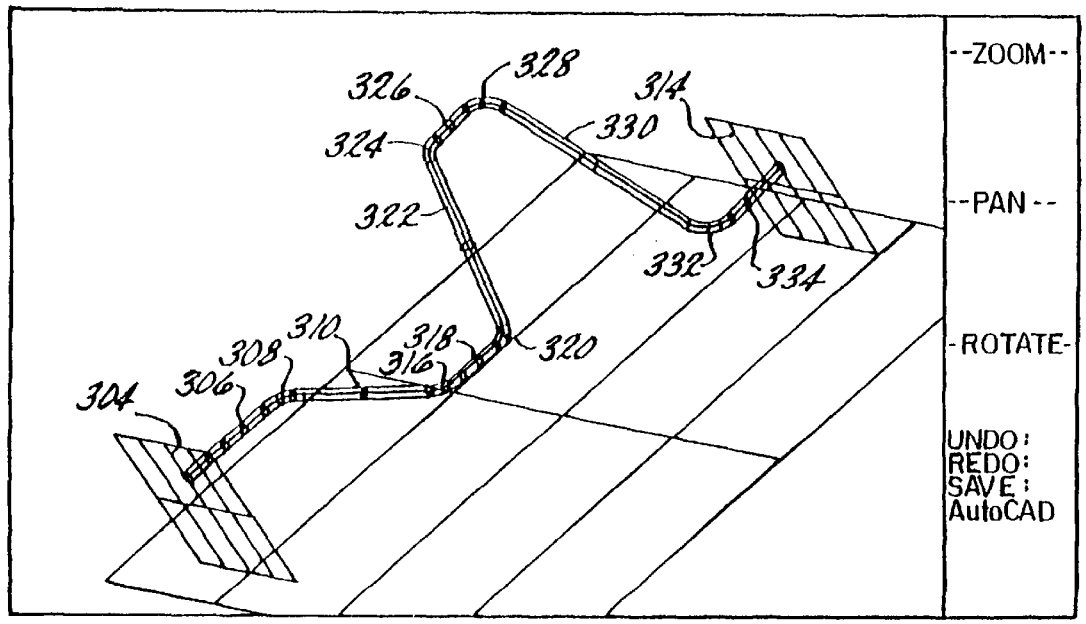
FIG. 6 depicts the device of FIG. 4 and is seen in this FIGURE as presenting a completed tube fitting as a result of the capability of the infinite set of possible orientations which does not require any additional features to complete the tube fitting as shown in accordance with the present invention.

Referring now to FIGS. 4–6, the tube fitter (operator) 250 takes the end of the CMM arm to which is attached a standard ball probe 264 where the interference disk 302 is mounted and initially places the interference extension on the starting feature 304 (shown as a plane) in FIGS. 4–6. A measurement is taken by simply pressing a button or switch on the end effector of the CMM arm. From this starting measurement, the first section that is required for this tube is a long straight section 306. A second point is taken by depressing the button or switch at a point near an obstruction to be traversed but far enough away that the interference disk 302 still will not contact the obstruction. This provides two points in space which are generally centrally located within the cross-section of the desired tube. The line connecting the two points forms the first straight section of the tube. Next, the operator 250 moves the probe along the desired path that will traverse the obstacle. The second point and the third point together form a second straight section. The software of the invention is then capable of constructing a curve 308 for the tubing having a constant radius and which will not cause a kink in the tubing and which will join sections 306 and 310. The radius is generated by the computer after input of wall thickness, exterior dimension of tube, and the material thereof, by the operator or the operator may specify the fixed radius, if desired. As will be appreciated by one of skill in the art, a tight angle between the line segments defined above would make a constant radius very difficult to achieve thus increasing the potential for a bind in the tube. Moreover, it is very possible due to the mechanics of clicking a pointer in mid air that the line segments are not capable of intersecting because of the three dimensional nature of their existence. To alleviate this situation, the points may be either locked in space or moveable in space.

The points become one or the other by the technician telling the machine whether they are locked or not in any number of conventional ways of providing instructions. The significance of locked or unlocked points is that where points are unlocked the software will move the points by lengthening or shortening straight sections or by moving points in space until the two sequential sections do intersect were they to be extended. The ability of the software to move points eliminates the need for complex curves which are difficult to machine and to determine. By ensuring intersection of sequential sections of pipe only a simple fixed radius curve is necessary. Software steps for correcting non-intersecting sections are described below. If it is determined by the computer that a fixed radius bend is not possible to be maintained by using points, an error message will be generated.

The completed tubing profile is generally shown at 312 (see FIG. 5) between starting feature 304 and end feature 314 (also shown as a plane as in feature 304). The rest of the fitted tube has sections that are alternately curved and straight to fill the space and at the same time avoid obstacles between feature 304 and feature 314. The curved sections and straight sections are designated 316, 318, 320, 322, 324, 326, 328, 330, 332 and 334, respectively from left to right in the FIGURES.

Curved section 316 and straight section 318 are developed (tube fitted) by repeating the steps that created straight section 306 and curved section 308 as previously discussed until the entire tube profile between features 304 and 314 is completed.

The computer screen presents the tube sections and curved or bent sections in real time as the tube profile is being created. Since the CMM is completely CAD-based, the computer model of the engine compartment of the example can be included in the display for completeness. The computer screen in accordance with the present invention also generates warnings and cautions for various problematic routing conditions.

For example, if two sequential straight sections do not intersect as proposed, then short joining straight sections may have to be created to complete the tubing profile. In other words, if it is not possible for the computer to create a constant radius bend to accommodate the sequential straight sections, additional straight sections may be needed. FIG. 4 is one of many views possible of a tube fitting in process. Note the full graphics of the tube profile and the convenient drop down menus and selection icons as shown in FIGS. 4 and 5.

Problems such as two straight sections not intersecting as mentioned in the previous paragraph are easily resolved by following the software steps in accordance with the present invention.

Nonintersecting segments and segments which cannot be joined by a specified fixed radius curve are rectified by the computer as follows:

1) Where the second point of the first segment and first point of the second segment are not locked, each segment will be moved toward the other in an equal increment whether the movement be by orientation of segments alone, or with length change as well.

2) Where the second point of the first segment is locked and the first point of the second segment is not locked, the second segment will be moved to intersect the first. It should be noted that there need not be an actual intersection of the two segments, rather there must be an intersection of projected axes from the segments. The curved section generated by the computer will actually join the segments.

3) Where the second point of the first segment is locked and the first point of the second segment are locked, the computer moves both segments in equal increments until intersection is possible. However, since these points are not supposed to have moved, the computer generates a message providing the distance between the lines and provides an option to the operator to undo the last segment and create the curve and segment anew by adding an additional straight section.

The correction of intersection and curve mating can be sequential steps, concurrent steps or can be individually performed if conditions so require or if desired by the operator.

In general, the software steps for tube fitting in accordance with this invention can be summarized with a flow chart (FIG. 7) and in words:

The first step by the operator is to select "tube fitting" from the "tube" sub-menu of the "measure" pull down menu as the menu appears on the computer screen. The operator will then be prompted to measure a cylinder (straight tube) and a plane at one end of tube profile. When this action is completed, the operator will be prompted to define two points on each segment of the tube and whether or not to "lock" those points in space. If a particular point is "locked", this means that this particular point on the tube segment can not be moved from that particular position.

In other words, if the second point of a tube segment is "locked" and the first point of the next segment is "not locked"; then this second segment will be moved by the computer so that this second segment intersects with the first segment.

However, if both the second point of a first segment and the first point of the next segment (second) are "not locked", then the two points will each be moved towards each other by equal increments until the two segments intersect.

Similarly, if both the second point of a first segment and the first point of the next (or second) segments are both "locked" in space, then the two segments will move towards each other in equal increments until they intersect and the distance between the two segments will be reported on the computer screen. Since the operator may not wish the segments to move as shown on the screen, the operator may optionally "undo" the last section and then add an extra straight section if needed or desired for design purposes. Once the operator is finished with the last segment (i.e., 334 in FIG. 6), then the operator presses the back button at the end of the CMM arm to cancel the next segment. The computer screen will then read a prompt "are you done with the last segment?". The operator then presses the front button to indicate "yes". The operator is then prompted to measure the last cylinder or segment 334 (see FIG. 6) and the plane of flange 314. Once this final straight section 334 is measured, the tube fitting software automatically calculates the pull/turn/bend specifications as well as the straight section intersections for purposes of analysis and manufacture. At this point, that is, with all measurements completed, the operator is prompted to key in the tube diameter and bend radius, if not already done. The X, Y, Z and pull/turn/bend data is displayed on the computer screen and printed out automatically.

The software in accordance with the present invention is capable of generating data in a variety of formats for the many different bending machines. These formats include relative, absolute, clockwise and counter clockwise formats. The fill CAD capabilities of the software allow for extremely clear perspective and multi-component presentations of the completed fitted tube.

Figure 3:
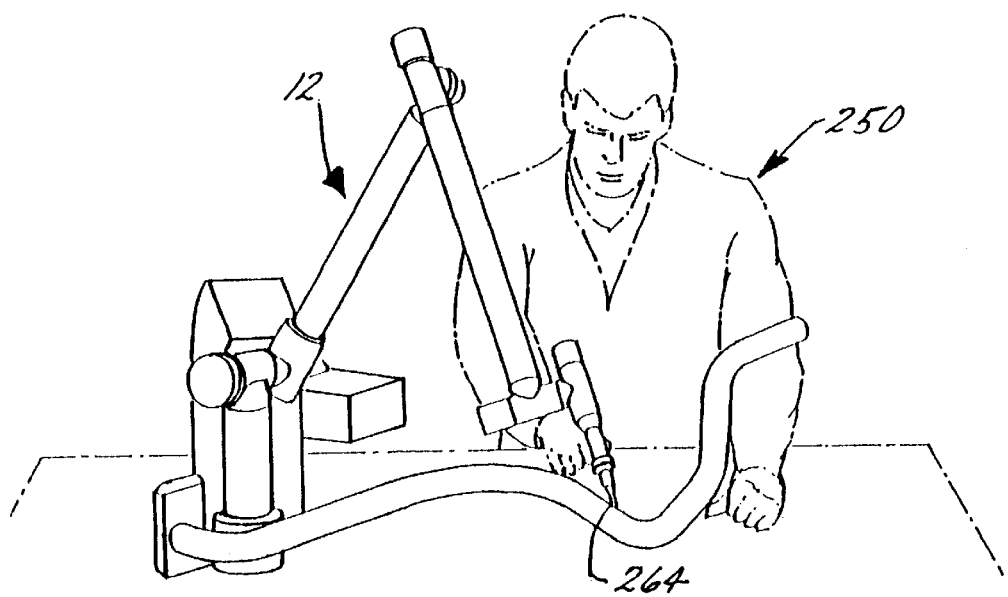
FIG. 3 depicts a portable CMM being used to inspect a section of tubing.

It should be noted that because of the need for different levels of accuracy required for various applications, there are a variety of known CMMs available. This is desirable since the lower the accuracy required, the less expensive is the CMM in general. CMMs currently are available that can measure to 12' in diameter and range in accuracy between +/−0.003" to +/−0.012". These same CMMs can be used to inspect prototype tubing as part of the tube fitting process in accordance with the present invention. FIG. 3 shows just such a CMM being used to inspect a section of automobile muffler pipe.

The CAD based CMM software in accordance with the present invention is capable of providing standard tube, surface and prismatic inspection. Specifically, the CAD based capabilities have led to the development of the novel solution for tube and pipe fitting resulting in quick and accurate pipe fitting without the use of templates and additionally, at the same time, provide the tube manufacturing data without additional steps. As previously discussed, CMMs are available in sizes and with accuracies that are convenient for most known applications and the software in accordance with the present invention is designed for easy use with graphics, user interfaces and provides complete user prompting.

In an alternate embodiment of the invention, the disk 302 would be fixedly attached to the end probe thus allowing the programmer to provide information to the computer of the exact location of exterior points of the tube to be generated. This is possible in this embodiment because the computer can be told exactly where the parameters are for the interference extension, that extension not being moveable relative to the handle. Thus, not only would the axis points be stored in memory, but the entire tube would be stored in memory. This may be desirable in some applications.

Moreover, the interference extension could remain mobile by providing a complex array of transducers at the ball end of the probe in printed circuit format to allow electrical connection of the extension with discrete points of the ball thus providing orientational information about the extension to the computer.

In yet another embodiment of the invention, two straight segments of tube would be created by three points as opposed to four. In this embodiment, the computer would not need to move points to create an intersection because the point of the intersection would already have been digitized. However, it may be necessary to shorten the straight sections in order that a curve could be generated capable of joining those sections. The radius of the curve in this embodiment would be determined solely by the computer based upon diameter of the tube, thickness of the material of the tube and the angle made between the segments created by point 1 and point 2 and by point 2 and point 3. Where the angle between these segments is too severe for a curve to be constructed, the computer generates a message prompting the operator to create additional points to arrange a series of fixed radius curves which strung together create a complex curve. Because of the plurality of points employed in this embodiment, however, the complex curve is easier to manufacture as a plurality of simple fixed radius curves.

In yet another embodiment of the invention the CMM is provided with reconfigured software in order to reverse engineer an existing pipe, the dimensions for which have been lost. In this embodiment, the operator is prompted to click on three points around the outer diameter of the pipe in roughly even spacing and as close as reasonably possible to a cross section of the pipe or tube. Essentially, the computer will calculate the center point of the pipe by triangulation. As the operator enters points in the triangulation pattern, the computer generates a three dimensional map of the pipe or tube which may be displayed in real time. This map, being fully digitized, may then be communicated to a manufactory for reproducing the subject pipe.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of producing bent tubing comprising:
   a) providing a coordinate measuring machine capable of measuring position and orientation in space by XY and Z coordinates of a probe;
   b) providing an interference extension at a distal end of the probe, said extension being mounted on a universal pivot;
   c) measuring and recording the path necessary to complete the part and recording the measurements;
   d) transferring the measurements to a manufacturing operation wherein said manufacturing operation produces bent tubing in accordance with the measurements recorded
   wherein said extension is of a geometry substantially replicating a cross-sectional geometry of the tube to be generated.

2. A method for making a bent tube comprising:
   a) providing a coordinate measuring machine having universal movement capability connected to a processor, a host computer, and a probe;
   b) attaching an interference extension to the probe of the CMM;
   c) manually moving said probe through space within the compartment in which the bent tube will be employed, said moving being such that the device is positioned to avoid interfering elements within the compartment;
   d) digitizing points in space while conducting the operation of manually moving the device and entering the points in a memory location within the host computer
   wherein said extension is of a geometry substantially replicating a cross-sectional geometry of the tube to be generated.

3. A method as claimed in claim 2 wherein said method further includes providing said points in space to a manufacturing arrangement, whereby bent tubing is constructed substantially matching the path traveled by the device.

4. A method as claimed in claim 2 wherein said bent or curved section of tube is of a constant radius.

5. A method for making a bent tube comprising:
   a) providing a coordinate measuring machine having universal movement capability connected to a processor, a host computer, and a probe;
   b) attaching an interference extension to the probe of the CMM;
   c) manually moving said probe through space within the compartment in which the bent tube will be employed, said moving being such that the device is positioned to avoid interfering elements within the compartment;
   d) digitizing points in space while conducting the operation of manually moving the device and entering the points in a memory location within the host computer wherein said step of manually moving said probe further includes manually moving said interference extension about said probe to ensure adequate clearance for the tube.

6. A method for making a bent tube comprising:
a) providing a coordinate measuring machine having universal movement capability connected to a processor, a host computer, and a probe;
b) attaching an interference extension to the probe of the CMM;
c) manually moving said probe through space within the compartment in which the bent tube will be employed, said moving being such that the device is positioned to avoid interfering elements within the compartment;
d) digitizing points in space while conducting the operation of manually moving the device and entering the points in a memory location within the host computer wherein said points in space are produced by
   a) placing the probe on a starting feature to which the resulting tube will be coupled and activating a switch to record at least one position in memory;
   b) moving the probe to a first location and activating the switch to record a point in memory to demarcate a first section of tube said first section extending between said starting feature and said first location;
   c) moving the probe to a second location and activating the switch to record a point in memory demarcating a beginning of a second section of tube;
   d) moving the probe to a third location and activating the switch to demarcate an end of a second section of tube, said second section of tube extending between the second location and the third location;
   e) providing an algorithm to create a bent or curved section of tube that joins the first section of tube and the second section of tube and
wherein the probe, when activated, records points which are selected from the group consisting of locked points and unlocked points.

7. A method as claimed in claim 6 wherein said locked points are not free to be moved by the operation of the algorithm.

8. A method as claimed in claim 6 wherein said unlocked points are free to be moved by the operation of the algorithm.

9. A method for making a bent tube comprising:
a) providing a coordinate measuring machine having universal movement capability connected to a processor, a host computer, and a probe;
b) attaching an interference extension to the probe of the CMM;
c) manually moving said probe through space within the compartment in which the bent tube will be employed, said moving being such that the device is positioned to avoid interfering elements within the compartment;
d) digitizing points in space while conducting the operation of manually moving the device and entering the points in a memory location within the host computer wherein said points in space are produced by
   a) placing the probe on a starting feature to which the resulting tube will be coupled and activating a switch to record at least one position in memory;
   b) moving the probe to a first location and activating the switch to record a point in memory to demarcate a first section of tube said first section extending between said starting feature and said first location;
   c) moving the probe to a second location and activating the switch to record a point in memory demarcating a beginning of a second section of tube;
   d) moving the probe to a third location and activating the switch to demarcate an end of a second section of tube said second section of tube extending between the second location and the third location;
   e) providing an algorithm to create a bent or curved section of tube that joins the first section of tube and the second section of tube and
wherein said sections of tube are moved toward or away from each other according to the algorithm to maintain the parameters of the desired tube for the created bent or curved section.

* * * * *